(12) United States Patent
Kobayashi

(10) Patent No.: US 8,908,280 B2
(45) Date of Patent: Dec. 9, 2014

(54) OPTICAL DEVICE, IMAGE DISPLAY APPARATUS, AND METHOD FOR MANUFACTURING OPTICAL DEVICE

(71) Applicant: Seiko Epson Corporation, Tokyo (JP)

(72) Inventor: Hidekazu Kobayashi, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/058,629

(22) Filed: Oct. 21, 2013

(65) Prior Publication Data

US 2014/0111865 A1 Apr. 24, 2014

(30) Foreign Application Priority Data

Oct. 22, 2012 (JP) ................................. 2012-232571

(51) Int. Cl.
*G02B 27/14* (2006.01)
(52) U.S. Cl.
USPC .......................................... 359/633; 359/630
(58) Field of Classification Search
USPC ......................................... 359/630–639, 359
See application file for complete search history.

(56) References Cited

U.S. PATENT DOCUMENTS

| 8,228,608 | B2 * | 7/2012 | Yamamoto | .................... 359/630 |
| 2003/0165017 | A1 | 9/2003 | Amitai | |

FOREIGN PATENT DOCUMENTS

| JP | A-2003-536102 | 12/2003 |
| WO | WO 01/95027 A2 | 12/2001 |

* cited by examiner

*Primary Examiner* — Mohammed Hasan
(74) *Attorney, Agent, or Firm* — Oliff PLC

(57) ABSTRACT

A head-mounted display that guides image light displayed by an image formation unit and focuses the image light on a viewer's side includes a light guide member that angularly converts the image light incident from the image formation unit based on reflection at a plurality of transflective layers, and a light absorption layer is disposed on each of the transflective layers. The light guide member has a light incident surface through which the image light is introduced into the light guide member, a prism reflection surface that is disposed at an end of the light guide member, serves as one of the plurality of transflective layers, and reflects the image light introduced through the light incident surface, and the light absorption layers disposed between the light guide member and the prism reflection surface.

15 Claims, 9 Drawing Sheets

OPTICAL DEVICE, IMAGE DISPLAY APPARATUS, AND METHOD FOR MANUFACTURING OPTICAL DEVICE

BACKGROUND

1. Technical Field

The present invention relates to an optical device that guides image light, an image display apparatus, and a method for manufacturing the optical device.

2. Related Art

A variety of display apparatus each of which is worn around the head for use and guides video image light from a display device through a light guide member to the eyeballs of a viewer, such as a head-up display, and a view finder of a video camcorder or any other imaging apparatus, have been proposed. One of the display apparatus of this type has a spectacle-like exterior appearance. For example, the display apparatus disclosed in JP-T-2003-536102 can reflect an image on a liquid crystal display toward the eyes of a viewer by using internal reflection and a plurality of transflective surfaces for image information observation.

A display apparatus of this type is, for example, specifically configured as follows: The display apparatus has a spectacle-like exterior appearance in which a substrate positioned in front of the eyes of a viewer is supported by temples hooked on the ears of the viewer; image light outputted from a display device, such as a liquid crystal display, built in each of the temples passes through an optical system in the temple in such a way that diffused light from each position on the display device is converted info a parallelized light flux; the parallelised light flux is then incident on the substrate and totally reflected off a prism reflection surface of the substrate; the totally reflected light flux then travels through the substrate while undergoing internal reflection; and the light flux is guided to an eyeball of the viewer via a plurality of transflective surfaces.

In the display apparatus disclosed in JP-T-2003-536102 described above, however, light outputted from the center of the display device is guided as the parallelized light flux through the substrate depending on the positions where a light source, the optical system in the temple, and other components are located and angles at which the prism reflection surface and transflective surfaces are set in the substrate, whereas light outputted from a position set apart from the center of the display device is first guided as the parallelised light flux but the prism reflection surface and the transflective surfaces change part of the parallelised light flux to a non-parallelised light flux having an angle different front an intended angle. Since the angle of the light guided through the substrate corresponds to the position of a light spot in the image light visually recognized by the viewer, the light having the angle different from an intended angle is disadvantageously recognised by the viewer as an inappropriate light spot that is what is called a ghost spot.

SUMMARY

An advantage of some aspects of the invention is to provide an optical device that guides video image light from a display device through a light guide member to an eyeball of a viewer and can reduce the degree of an inappropriate light spot that is what is called a ghost spot produced on the retina in the eyeball of the viewer. Another advantage of some aspects of the invention is to provide an image display apparatus.

An aspect of the invention is directed to an optical device including a light guide member that guides image light from a light incident portion on which the image light is incident to a light exiting portion from which the image light exits and a first optical layer disposed in the light guide member, tiltedtilted to a surface of the light exiting portion, and optically acting on the guided image light, and the first optical layer is a layered film produced by layering a first light absorption layer that absorbs part of the guided image light and a first transflective layer that reflects at least part of the image light an absorbed by the first light absorption layer toward the light exiting portion and transmits at least another part of the unabsorbed image light.

In the optical device according to the aspect of the invention described above, an inappropriate angular component of the image light incident on the light incident portion is absorbed and eliminated by the first light absorption layer when the inappropriate angular component is reflected or passes through the first transflective layer. In detail, an angular component appropriately incident on the light guide member is incident on the first transflective layer at a deep angle and hence travels a short distance in the first light absorption layer, which means that the amount of absorbed light is small, whereas an angular component inappropriately incident on the light guide member is incident on the first transflective layer at a shallow angle and hence travels a long distance in the first light absorption layer, which means that the amount of absorbed light is large. As a result, only the inappropriately incident angular component can be absorbed and eliminated, whereby the degree of produced ghost spot can be reduced.

Another aspect of the invention is directed to an optical device including a light guide member that guides image light from a light incident portion on which the image light is incident to a light exiting portion from which the image light exits and a second light absorption layer provided on a surface of the light guide member. The light guide member has a reflection surface tiltedtilted to a surface of the light incident portion, and the second light absorption layer is disposed on the reflection surface.

In the optical device according to the aspect of the invention described above, an inappropriate angular component of the image light incident on the light incident portion is absorbed and eliminated by the second light absorption layer provided on the reflection surface. In detail, an angular component appropriately incident on the light guide member is incident on the reflection surface at a deep angle and hence travels a short distance in the second light absorption layer, which means that the amount of absorbed light is small, whereas an angular component inappropriately incident on the reflection surface is incident on the reflection surface at a shallow angle and hence travels a long distance in the second light absorption layer, which means that the amount of absorbed light is large. As a result, the inappropriate angular component of the incident image light can foe eliminated in the light incident portion.

In the optical device according to the aspect of the invention described above, it is preferable that the first light absorption layer is located on the side of the first transflective layer that faces the light exiting portion. In this case, an inappropriate angular component of the image light guided through the light guide member and exits out of the light exiting portion toward a viewer can be absorbed before the inappropriate angular component exits outside.

In the optical device according to the aspect of the invention described above, it is preferable that the optical device further includes a second optical layer that optically acts on the image light having passed through the first transflective layer, and the second optical layer is preferably a layered film produced by layering a third light absorption layer that absorbs part of the image light having passed through the first transflective layer and a second transflective layer that reflects at least part of the image light having passed through the first transflective layer but having been unabsorbed by the third light absorption layer toward the light exiting portion and transmits at least another part of the unabsorbed linage light. According to this aspect of the invention, since the third light absorption layer can absorb image light incident on the second transflective layer at a shallow angle, the degree of a ghost spot can be reduced.

In the optical device according to the aspect of the invention described above, it is preferable that the first optical layer and the second optical layer extend in a direction tilted to the surface of the light exiting portion by an angle ranging from 29° to 31°. In this case, the amount of black vertical stripes present in a transmitted image can he reduced.

In the optical device according to the aspect of the invention described above, it is preferable that each of the first transflective layer and the second transflective layer includes a dielectric multilayer film. In this case, light transmissiveness and light reflectiveness can be more appropriately maintained.

In the optical device according to the aspect of the invention described above, it is preferable that the optical device further includes a reflection film on an outer surface of the second light absorption layer. In this case, reflectance at which an appropriate angular component is reflected can be ensured while light absorption can be appropriately maintained, whereby only an inappropriate angular component can be more reliably eliminated.

Still another aspect of the invention is directed to a method for manufacturing an optical device that guides image light from a light incident portion on which the image light is incident to a light exiting portion from which the image light exits, the method including forming a layered member between a first light transmissive bass and a second light transmissive base, the layer member including a first light absorption layer that absorbs part of light incident thereon and a first transflective layer that reflects at least part of the light reabsorbed by the first light absorption layer and transmits at least another part of the unabsorbed light, and cutting the layered member in a direction tilted (inclined) to the direction in which the first transflective layer and the first light absorption layer extend. According to this aspect, the first transflective layer can be readily maintained parallel, whereby the light guide member can be manufactured with precision.

Yet another aspect of the invention is directed to an image display apparatus including any of the optical devices described above. The image display apparatus according to this aspect is, for example, a head-mounted display, and when video image light displayed by an image formation unit, such as a liquid crystal display, is guided to the eyeballs of a viewer through the light guide member, only an inappropriate angular component of image light guided through the light guide member can be absorbed and eliminated by the light absorption layer, whereby the degree of an inappropriate light spot or what is called a ghost spot produced on the retina in each of the eyeballs of the viewer can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1A:
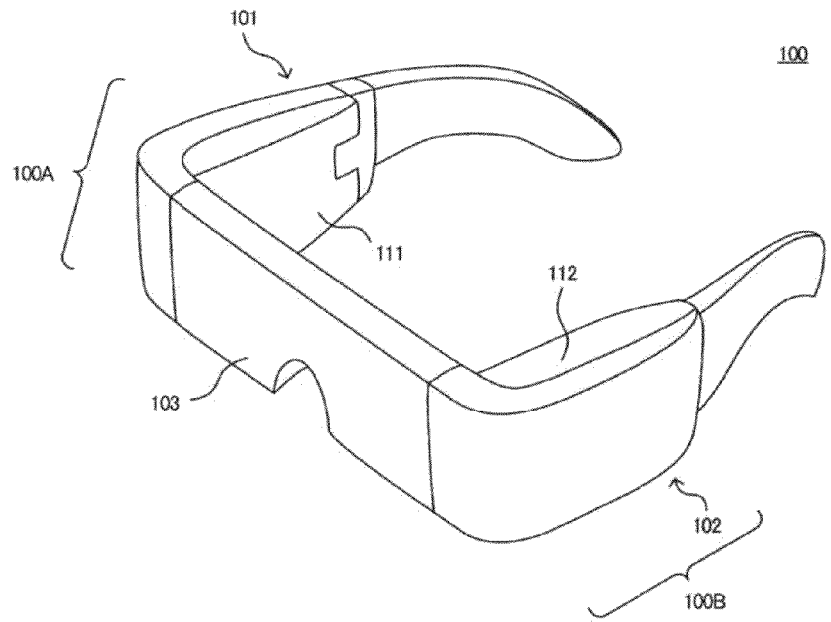
FIG. 1A is a perspective view showing an entire head-mounted display according to a first embodiment.
Figure 1B:
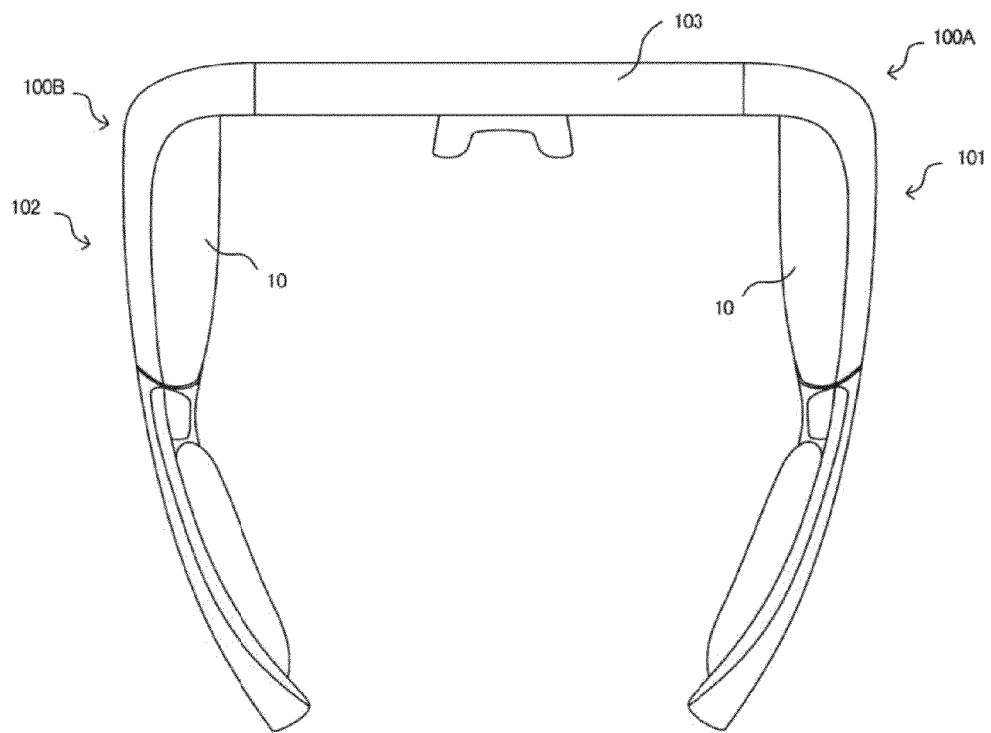
FIG. 1B is a plan view of the head-mounted display.

A head-mounted display according to an embodiment of the invention will be described below in. detail with reference to the accompanying drawings. In the drawings, the ratio of dimensions of each portion differs from an actual one as appropriate. The embodiment shows an aspect of the invention but does not limit the invention and can be arbitrarily changed within the scope of a technical spirit of the invention.
Overall Configuration of Head-Mounted Display FIG. 1A is a perspective view showing an example of an entire head-mounted display 190 according to the present embodiment, and FIG. 1B is an exemplary plan view of the head-mounted display 100. The head-mounted display 100 according to the present embodiment has a spectacle-like exterior appearance and allows a viewer who wears the head-mounted display 100 to not only recognize image light in the form of a virtual image but also view an environment image in see-through observation.

The head-mounted display 100 specifically includes a light guide member 103, a pair of right and left temples 101, 102, which support the light guide member 103, and a pair of image formation sections 111 and 112, which are attached to the temples 101 and 102 respectively. In FIGS. 1A and 1B, a first display apparatus 100A, which is a combination of a left part of the light guide member 103 and the image formation section 111, is a portion that forms a virtual image for the right eye and functions alone as a display apparatus. Further, in FIGS. 1A and 1B, a second display apparatus 100B, which is a combination of a right part of the light guide member 103 and the image formation section 112, is a portion that forms a virtual image for the left eye and functions alone as a display apparatus.

Figure 2:
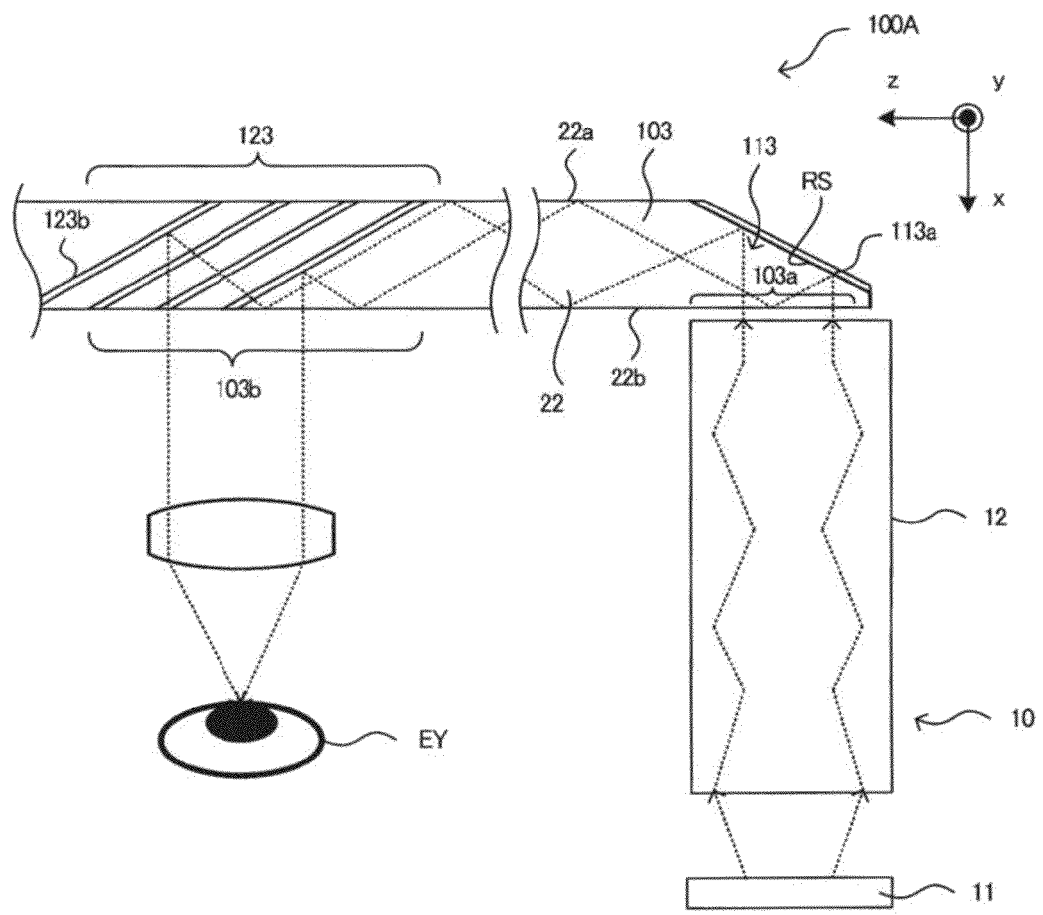
FIG. 2 is a cross-sectional view of a key portion showing the internal structure and the optical path of the head-mounted display according to the first embodiment.

A description will be made of the internal structure and the optical path of the thus configured head-mounted display 100. FIG. 2 is a cross-sectional view of a key portion diagrammatically showing an example of the internal structure and an example of the optical path of the head-mounted display according to one present embodiment. The first display apparatus 100A includes an image formation unit 10 and the light guide member 103, as shown in FIG. 2.

The image formation unit 10 includes a display device 11 and a projection system 12. The display device 11 can be use a liquid crystal display, an organic EL display device, or any other suitable device. For example, when a liquid crystal display is used, a light source is driven to emit light containing three color light fluxes, specifically, red, green, and blue light fluxes, and the liquid crystal display converts the light from the light source into a diffusing light flux having a rectangular cross-sectional shape, which is outputted toward the projection system 12. On the other hand, the projection system 12 is a colligation lens that converts the diffusing image light outputted from each point on the display device 11 into a parallelised light flux and causes it to enter the light guide member 103. Each of the parallelized light fluxes emits out of the projection system 12 at an angle according to the position on the display device 11 from which the light flux is outputted. That is, the projection system 12 is a transducer that converts information on the image position in a fiat plane of the display device 11 into angular information.

As an example of the overall exterior appearance of the light guide member 103, the light guide member 103 is formed of a flat-plate-shaped member extending in parallel to the 12 plane in FIG. 2. The light guide member 103 has an angle converter 123, which is located in one end portion in the longitudinal direction and formed of a plurality of semitransparent transflective layers 123b embedded in the light guide member 103, and a prism portion 113, which is located in the other end portion in the longitudinal direction and so formed that the light guide member 103 is extended.

The light guide member 103 is made, for example, of a light transmissive resin material and has a light incident surface 103a, which is a light incident portion that receives image light from the image formation unit 10, and a light exiting surface 103b, through which the image light exits toward an eye EY of the viewer, with the light incident surface 103a and the light exiting surface 103b formed along a surface parallel to the YZ plane and facing the image formation unit 10. The light guide member 103 further has a prism reflection surface RS, which reflects the received image light. In the light guide member 103, the angle converter 123, which is formed of a multilayer structure formed of the transflective layers, is formed between the light exiting surface (light exiting portion) 103b and a front-side or environment-side surface that faces away from the light exiting surface 103b.

The prism reflection surface RS, which is so disposed that it faces but is tilted to the light incident surface 103a of the light guide member 103, functions as a reflection surface that reflects light incident thereon and deflects the optical path in a predetermined direction that is substantially perpendicular to the direction of the incident light. That is, the prism portion 113 deflects the image light incident through the light incident surface 103a, which is the light incident portion, and directed in the −X direction as a whole in such a way that the incident image light is directed in the +Z direction but shifted in the +X direction as a whole. The image light is thus introduced into the light guide member 103. A film made, for example, of aluminum may be formed on the prism reflection surface RS (prism surface), which has been described above, of the light guide member 103, for example, in a deposition process.

The light guide member 103 further has a light guide portion 22, which extends from the light-incident-side prism portion 113 to the far-side angle converter 123 and guides the image light having entered the light guide member 103 through the prism portion 113 to the angle converter 123. The light guide portion 22 has two fiat surfaces that are principal surfaces of the flat-plate-shaped light guide member 103, face each other, and extend in parallel to the YZ plane, a first total reflection surface 22a and a second total reflection surface 22b, each of which totally reflects the image light deflected by the prism portion 113.

It is assumed in the description that the first total reflection surface 22a is located on the environment side, which is away from the image formation unit 10, and that the second total reflection surface 22b is located on the observation side, which is close to the image formation unit 10. In this case, the second total reflection surface 22b is a common surface portion that forms the light incident surface 103a and the light exiting surface 103b. The image light reflected off the prism portion 113 is first incident on and totally reflected off the second total reflection surface 22b. The image light is then incident on and totally reflected off the first total reflection surface 22a. The total reflection action is repeated to guide the image light to the far side of the light guide member 103, that is, the +Z side where the angle converter 123 is provided. No reflection coat is provided on the first or second total reflection surface 22a, 22b, and environment light incident from the environment on the total reflection surfaces 22a and 22b therefore passes through the light guide portion 22 in a highly transmittable manner. That is, the light guide portion 22 allows the wearer to view an environment image therethrough in see-through observation.

Figure 5:
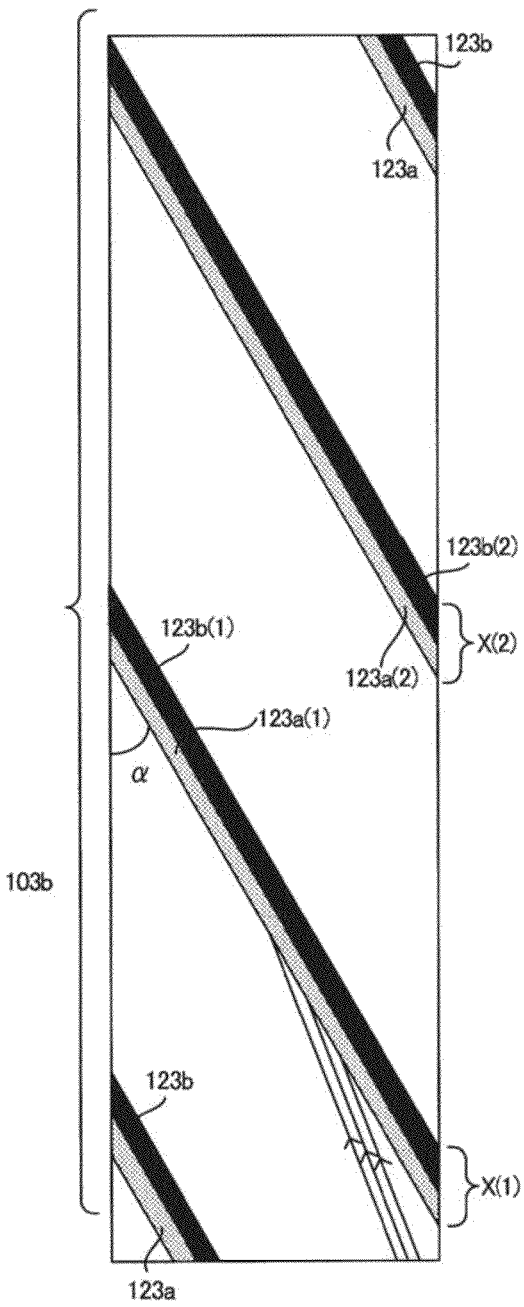
FIG. 5 is an enlarged view showing that a ghost spot is eliminated by an absorption layer according to the first embodiment.

The angle converter 123 includes a plurality of optical layers X (first optical layer and second optical layer). Each of the optical layers is formed of a layered film produced by layering a transflective layer 123b (first reflection layer or second reflection layer) and a light absorption layer 123a (first light absorption layer or third light absorption layer) on each other, as shown in FIG. 5. Some reference characters shown in FIG. 5 are followed by parenthesis "(1)" or "(2)", which is used in a description where each of the optical layers X, the transflective layers 123b, and the light absorption layers 123a is distinguished from the others.

In the angle converter 123, the plurality of transflective layers 123b are so formed that they are arranged in parallel to each other and tilted at a predetermined angle, and each of the plurality of transflective layers 123b functions as a multilayer mirror. In the present embodiment, each of the transflective layers 123b is tilted to the light exiting surface 103b by α=30°, as shown in FIG. 5. The angle is so set that it is equal to the angle of the prism reflection surface RS with respect to the second total reflection surface 22b (30°). When light outputted from a central portion of the display device 11 is configured to be incident on the light incident surface 103a at right angles, and the transflective layers 123b and the prism reflection surface RS are so set that they are tilted by the same angle, the light outputted from the display device 11 is appropriately totally reflected within the light guide portion 22 and reaches the multilayer mirrors in the angle converter 123. Since the angle of the guided light with respect to the first total reflection surface 22a and the second total reflection surface 22b is 30°, which is equal to the angle of the multilayer mirrors, light traveling from the second total reflection surface 22b toward the first total reflection surface 22a does not intersect the multilayer mirrors. On the other hand, light outputted from a position set apart from the center of the display device 11 passes through the projection system, which causes the light to be incident on the second total reflection surface 22b at a non-right angle.

As a result, part of the light traveling in the vicinity of the prism reflection surface RS from the second total reflection surface 22b toward the first total reflection surface 22a and part of the light traveling in the vicinity of the multilayer mirrors in the angle converter 123 from the first total reflection surface 22a toward the second total reflection surface 22b, specifically, part of the light that is not parallel to the prism reflection surface RS or the multilayer mirrors, is reflected off the prism reflection surface RS or the multilayer mirrors at a shallow angle. The reflection causes the light to exit through the light exiting surface 103b in a direction different from an intended direction, resulting in a ghost spot visually recognised in a positron different from an intended position. Providing a light absorption layer 123a on the prism reflection surface RS or each of the multilayer mirrors can reduce the degree of produced ghost spot.

The angle converter 123 is formed along an extension surface of the first total reflection surface 22a on the far side of the light guide portion 22 (+Z side) and in the vicinity of the extension surface. The angle converter 123 receives the image light having traveled via the first and second total reflection surfaces 22a, 22b of the light guide portion 22 and impinged on the angle converter 123 and reflects the image light at a predetermined angle of reflection to deflect the image light toward the light exiting surface 103b. That is, the angle converter 123 converts the angle of the image light. Further, in the present embodiment, the angle converter 123, which is formed of a plurality of semitransparent, transflective layers 123b, allows the viewer to view an environment image therethrough, although environment light is attenuated to some extent.

According to the thus configured light guide member 103, image light that exits out of the image formation unit 10 and enters the light guide member 103 through the light incident surface 103a is uniformly reflected and deflected off the prism portion 113, repeatedly totally reflected off the first and second total reflection surfaces 22a, 22b of the light guide portion 22 to travel substantially along the optical axis while constantly spreading, deflected off the angle converter 123 by a proper angle and ready to be extracted, and finally outputted through the light exiting surface (light exiting portion) 103b. The image light outputted through the light exiting surface 103b is incident on the eye EY of the viewer in the form of virtual light. When the virtual light is focused on the viewer's retina, the viewer can recognize the image light, such as video image light, in the form of a virtual image.

Configuration of Transflective Layers

In the present embodiment, as a mechanism that removes light incident on any of the transflective layers 123b at a shallow angle, the light absorption layers 123a are disposed on the transflective layers 123b.

Figure 3A:
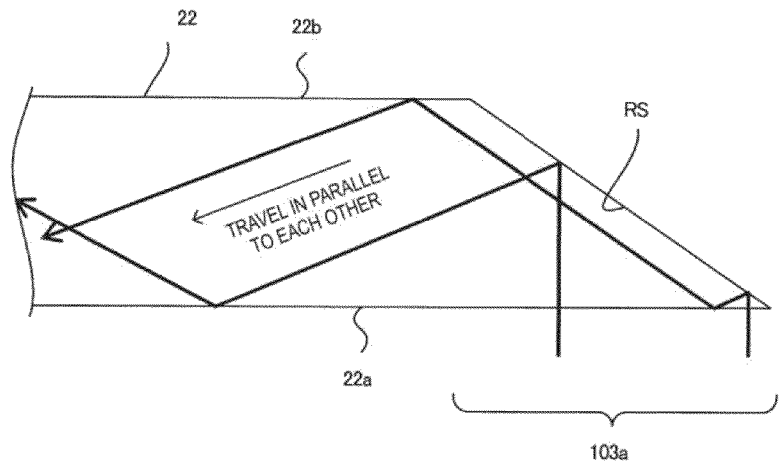
FIG. 3A is a cross-sectional view of a key portion showing appropriate optical paths in a head-mounted display of related art.
Figure 3B:
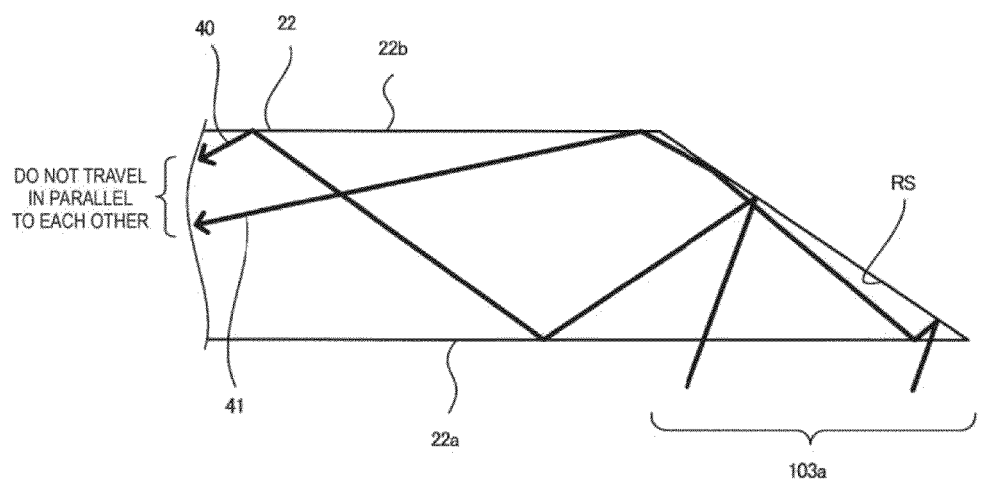
FIG. 3B is a cross-sectional view of the key portion showing optical paths in a case where a ghost spot is produced in the head-mounted display of related art.

The light removal mechanism will be described in detail. In image light outputted from a display surface of the display device 11 according to the present embodiment, radiated light outputted from the center of the display surface shown in FIG. 3A is converted by the optical system 12 into a parallelized light flux perpendicular to the light incident surface 103a and incident on the light guide portion 22, appropriately reflected within the light guide portion 22, and guided to the eyeball of the viewer. On the other hand, radiated light outputted from a position set apart from the center of the display surface of the display device 11 is converted into a parallelised light flux that intersects the light incident surface 103a at a non-right angle, as shown in FIG. 3B.

Figure 4A:
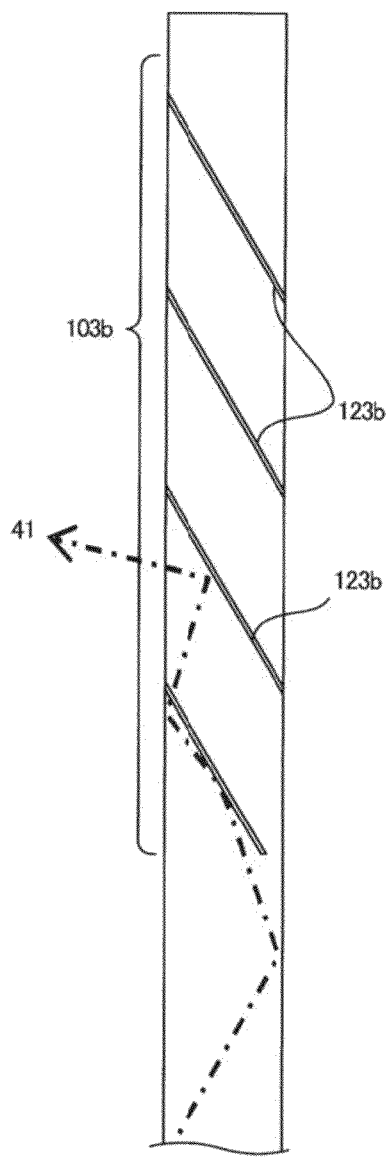
FIGS. 4A and 4B are cross-sectional views of a key portion showing optical paths for different angular components in a case where a ghost spot is produced in the head-mounted display of related art.
Figure 4B:
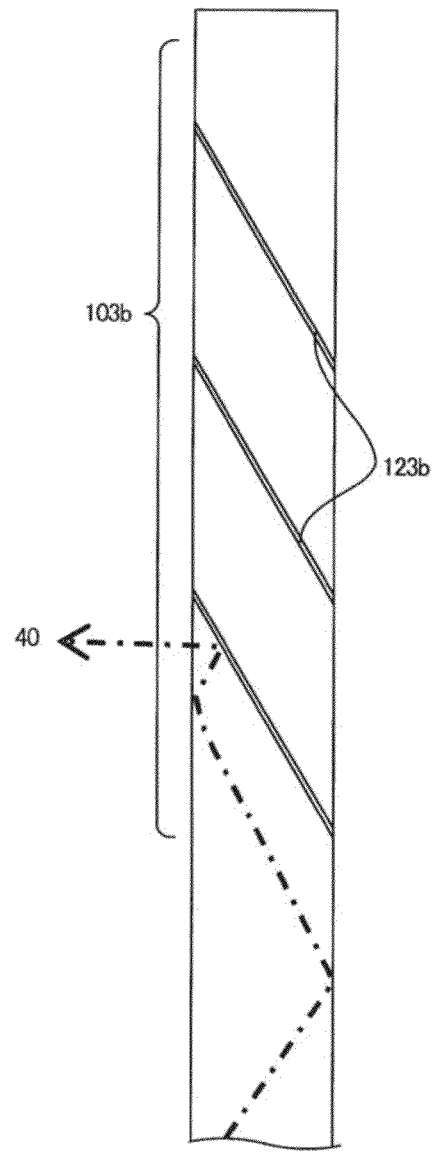

In the light flux incident at the non-right angle, light traveling along a correct optical path 40 undergoes appropriate reflection as in the case of FIG. 3A where light is incident on the light incident surface 103a at right angles, whereas light traveling along a ghost producing optical path 41 is reflected twice off the prism reflection surface RS and tilted to the correct optical path 40 after the second reflection, in which the light is incident on the prism reflection surface at a shallow angle. The light traveling along the ghost producing optical path 41 is incident on and reflected off a transflective layer 123b also at a shallow angle, reflected off another transflective layer 123b again, and then exits through the light exiting surface 103b, as shown in FIG. 4A. In contrast, the radiated light outputted from the center of the display surface of the display device 11, which is guided while undergoing correct reflection, is reflected off a transflective layer but not at a shallow angle within the light guide portion 22 and exits through the light exiting surface 103b, as shown in FIG. 4B.

Figure 9A:
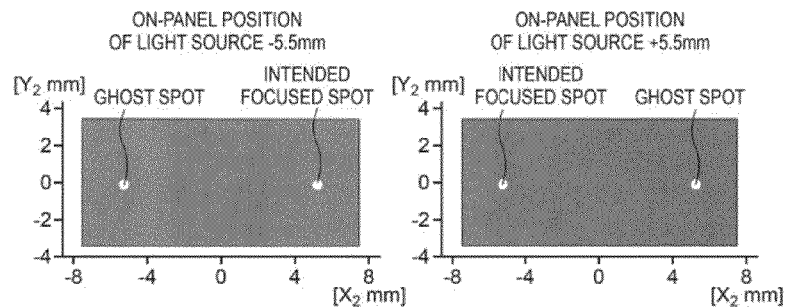
FIG. 9A is a descriptive diagram showing a ghost spot produced in the head-mounted display of related art.

As a result, an inappropriate light spot produced by light that reaches a position different from an intended focus position is viewed with the eyeball as what is called a ghost spot, as shown in FIG. 9A.

To address the problem, in the present embodiment, the light absorption layers 123a are disposed on the eyeball-side surfaces of the transflective layers 123b (surfaces facing light exiting surface 103b), as shown in FIG. 5. In detail, in the present embodiment, the base of the light guide portion 22 is made of PMMA (PolyMethyl MethAcrylate), COC (CyclicOlefin Copolymer), COP (CyclicOlefin Polymer), or any other highly transparent material, and a transflective layer 123b and a light absorption layer 123a are layered on a surface the light guide portion 22. As the transflective layer 123b, a transflective film produced by layering a light absorption layer and a metal film or a dielectric multilayer film can be sandwiched between bases. The light absorption layer 123a can be made, for example, of carbon, titanium black, or a black dye and can be a film produced by mixing PMMA, COC, COP, or any other transparent material with any of the materials described above by an appropriate amount. In the present embodiment, the light absorption layers 123a are disposed only on the eyeball-side surfaces of the transflective layers 123b. Instead, the light absorption layers 123a may be disposed, for example, on both the front and rear surfaces of the transflective layers 123b or only on the surfaces of the transflective layers 123b that face away from the eyeball side.

As described above, in the present embodiment, a first optical layer X1, which is tilted to the light exiting surface 103b and optically acts on guided image light, is provided as shown in FIG. 5, and the first optical layer X1 is a layered film produced by layering a first light absorption layer 123a(1) which absorbs part of the guided image light, and a first transflective layer 123b(1), which reflects at least part of the image light unabsorbed by the first light absorption layer 123a(1) toward the light exiting surface 103b and transmits at least another part of the unabsorbed image light. Further, a second optical layer X1, which optically acts on the image light having passed through the first transflective layer 123b (1), is provided, and the second optical layer X2 is a layered film produced by layering a third light absorption layer 123a (2), which absorbs part of the image light having passed through the first transflective layer 123b(1), and a second transflective layer 123b(2), which reflects at least part of the image light having passed through the first transflective layer 123b(1) but having been unabsorbed by the third light absorption layer 123a(2) toward the light exiting surface 103b and transmits at least another part of the unabsorbed image light.

Method for Manufacturing Light Guide Member

Figure 6A:
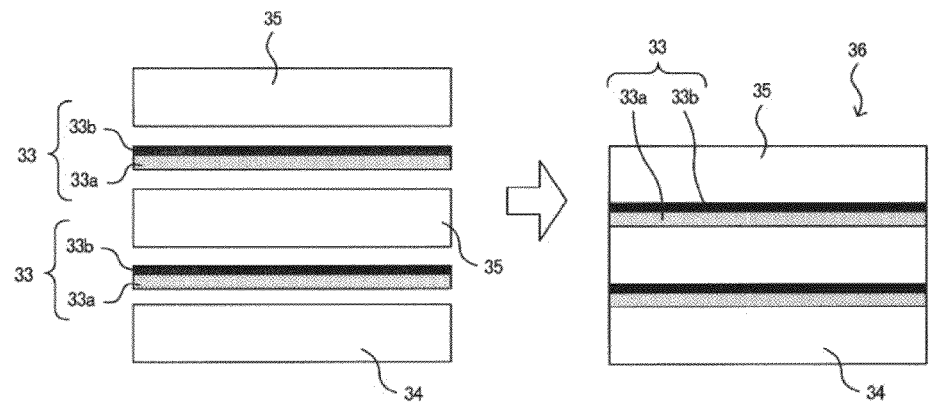
FIGS. 6A and 6B are descriptive diagrams showing the procedure of a method for manufacturing a light guide member according to the first embodiment.
Figure 6B:
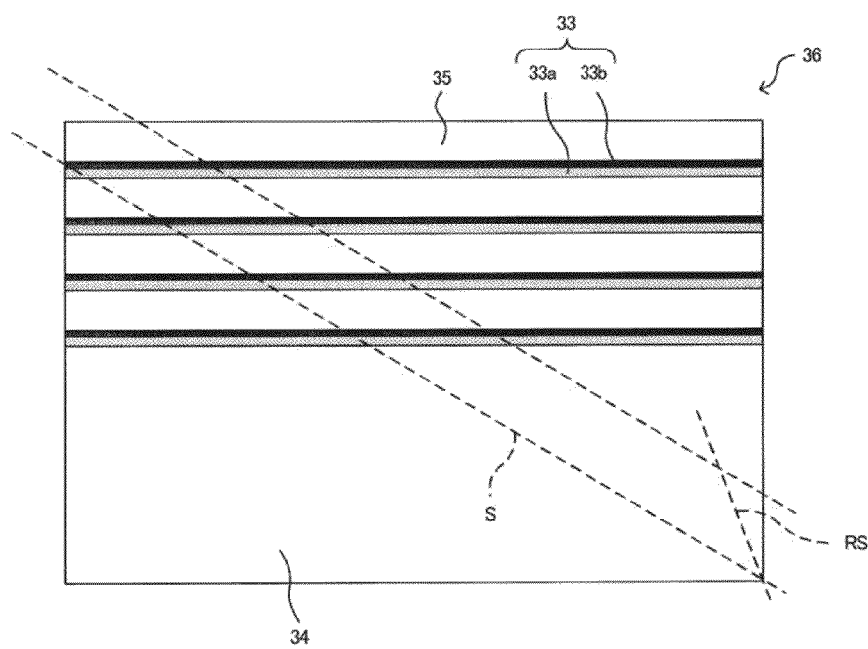

The light guide member 103 including the transflective layers 123b described above can be manufactured based on the following procedure. FIGS. 6A and 6B are descriptive diagrams showing an example of a method for manufacturing the light guide member 103 according to the present embodiment.

That is, the light guide member 103 is formed by bonding a plurality of layered light transmissive bases (first light transmissive base and second light transmissive base) with a transflective layer 123b and a light absorption layer 123a interposed between the bases to form a layered member and cutting the layered member in a direction tilted to the thickness direction. Each of the light transmissive bases includes a transparent member as a substrate and a transparent film.

In detail, a transflective film 33 is configured by forming a thin film 33b (2 to 20 nm in thickness), which is made, for example, of a silver alloy and serves as a transflective film, in a sputtering or deposition process on a light transmissive base 34, in which a light absorption film 33a (about 50 to 300 μm in thickness), which absorbs light, is formed, as shown in FIG. 6A. The light absorption film 33a is formed by mixing the light transmissive base 34 with an appropriate amount of carbon, titanium black, black dye, or any other suitable material.

The transflective film 33 is then bonded (with an adhesive or in a thermal contact bonding process) onto the light absorption film 33a on the light transmissive base 34, a light transmissive base 35 having a specific thickness (about 2 to 10 mm) is further bonded onto the resultant structure, and another transflective film 33 formed in the same manner as described above (the thickness of the transflective layer is so optimized that uniform brightness is achieved in a final display state) is bonded onto the resultant structure. Another light transmissive base 35 is then bonded onto the thus attached transflective film 33. The steps described above are repeated to form a layered member 36 having a necessary number of transflective layers. In the description, the layered member 36 is formed by repeating the layering processes. Alternatively, the light transmissive bases and the transflective films may be layered on and bonded (with an adhesive or in a thermal contact bonding process, for example) to each other in a single process. Each of the transflective layers is not necessarily formed of a metal film and may be formed of a dielectric multilayer film.

The thus formed layered member 36 is then so cut along broken lines in FIG. 6B that the transflective films described above are tilted to the light exiting surface 103b by an angle ranging from 29° to 31°, as shown in FIG. 6B. The light guide member 103 is thus cut off the layered member 36. The thus cut light guide member undergoes a smoothing process in which the surface thereof is polished or coated with a transparent member so that the light guide member has a mirror-finished surface. A prism surface is formed at an end of the light guide member by cutting the light guide member to form an tilted surface.

Figure 7A:
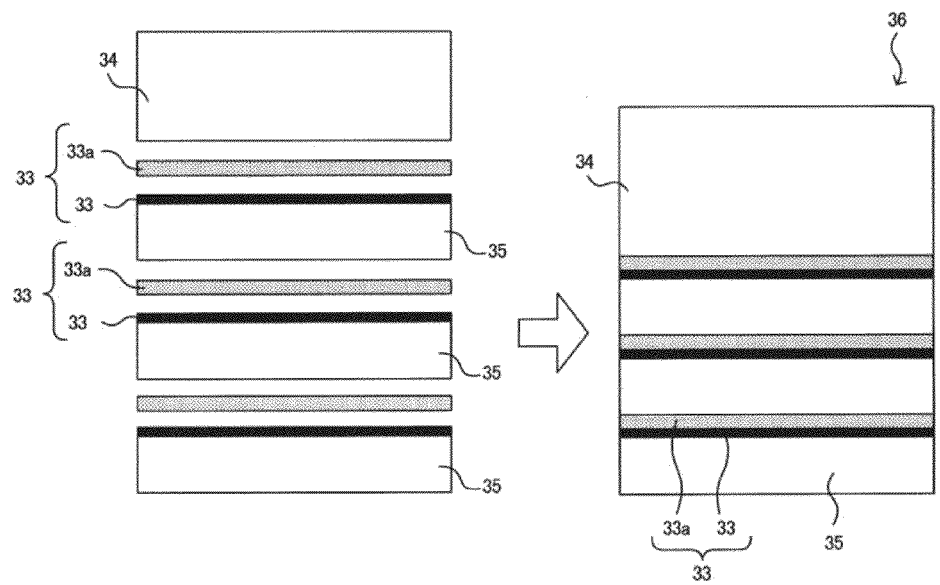
FIGS. 7A and 7B are descriptive diagrams showing the procedure of another method for manufacturing the light guide member according to the first embodiment.
Figure 7B:
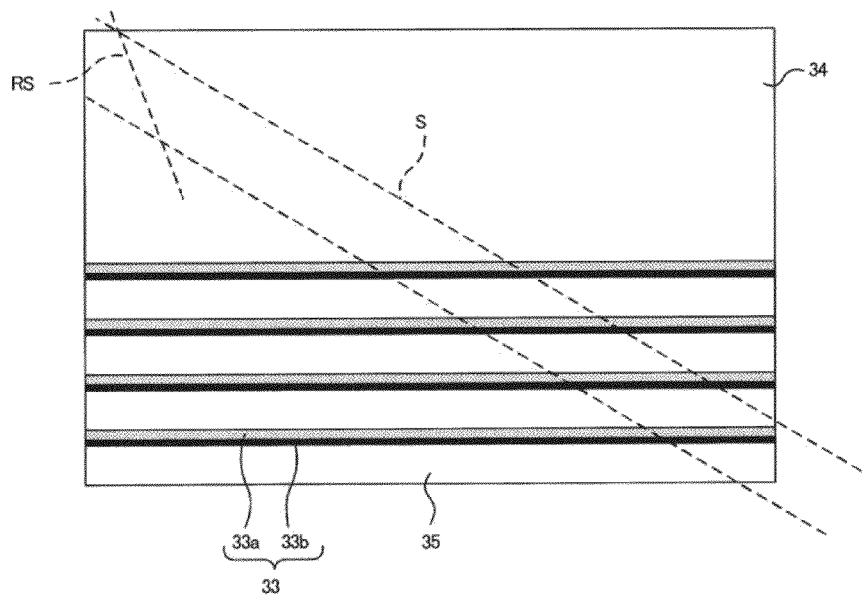

The method for forming the layered member including the transflective films is not limited to the method described above and may, for example, foe a method shown in FIGS. 7A and 7B in which the following steps are repeated: The resin described above mixed with a light absorption material is applied onto a transparent member in a hot melt process; a transflective film is coated on the resultant structure; another transparent member is attached to the resultant structure; and the light absorption layer described above is formed in a hot melt process. Other manufacturing methods can be used as long as the structure described above is achieved.

Advantageous Effects Provided by Present Embodiment

According to the present embodiment described above, an inappropriate angular component of image light having exited out of the image formation unit 10 is absorbed and eliminated by the light absorption layers 123a when the inappropriate angular component is reflected off the transflective layers 123b in the light guide member 103, as shown in FIG. 5. In particular, in the present embodiment, since the light absorption layers 123a are disposed on the surfaces of the transflective layers 123b that face the eyes of the viewer, an inappropriate angular component of the image light guided through the light guide member 103 and outputted toward the viewer can be absorbed in the last portion of the optical path for more reliable elimination of the inappropriate angular component.

In detail, an angular component appropriately incident on the light guide portion 22 is incident on the transflective layers 123b at a deep angle (about 30° with respect to a normal to the reflection layers) and hence travels a relatively short distance therein, which means that the amount of absorbed light is small. On the ether hand, part of light from a position set apart from the center of the display device is incident on the transflective layers 123b at a shallow angle (about 80° to 90° with respect to a normal to the reflection layers) and hence travels a long distance therein, which means that the amount of absorbed light is large. That is, light incident on a transflective layer 123b having a thickness d at an angle $\theta$ travels a distance $d/\sin\theta$ in the light absorbing layer 123a. When $\theta=5°$, the light travels a distance d multiplied by 11.5. When the transmittance is 80% for the thickness d, the resultant transmittance is 0.8 to the 11.5-th power, which means that substantially all the light is absorbed.

Figure 9B:
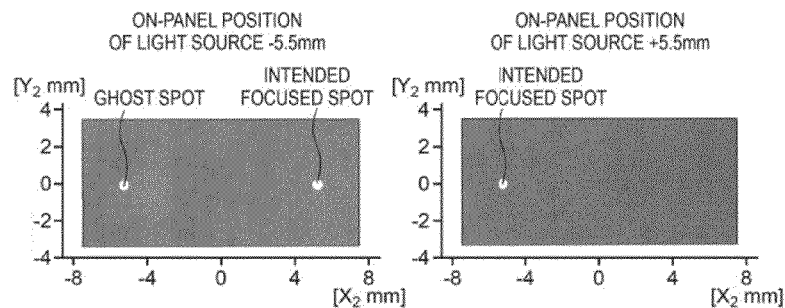
FIG. 9B is a descriptive diagram showing that the ghost spot is eliminated in the first embodiment.

Specifically, image light from an upper portion of the light guide portion 22 is not reflected off a transflective layer 123b in the light guide portion 22 but is absorbed by a light absorption layer 123a, as shown in FIG. 5. Image light from a lower portion of the light guide portion 22 may be reflected off a transflective layer 123d in the light guide portion 22 but has been sufficiently absorbed and attenuated by a light absorption layer 123a, and the image light is therefore eliminated at the light exiting surface 103b or the interface of the light guide portion 22. As a result, according to the present embodiment, only an inappropriately incident angular component can be absorbed and eliminated, whereby the amount of produced ghost spot can be reduced, as shown in FIG. 9B.

Further, in the present embodiment, the angle between the light exiting surface 103b and the transflective layers 123b of the light guide portion 22 is 30° but may be an angle ranging from 29° to 31°. When the angle is within this range, shadows of the transflective mirrors are unlikely to affect a displayed image, whereby an image can be satisfactorily displayed with a relatively small amount of black stripes as compared with cases where the transflective layers are set at other angles with respect to the light exiting surface.

Second Embodiment

A second embodiment of the invention will next be described. In the first embodiment described above, the light absorption layers are disposed on the transflective layers 123b, whereas the present embodiment is characterized in that only one light absorption layer described above is disposed on the prism reflection surface RS. In the present embodiment, the same components as those in the first embodiment described above have the same reference characters and have the same functions and other features unless otherwise stated, and no description of the same components will be made.

Figure 8A:
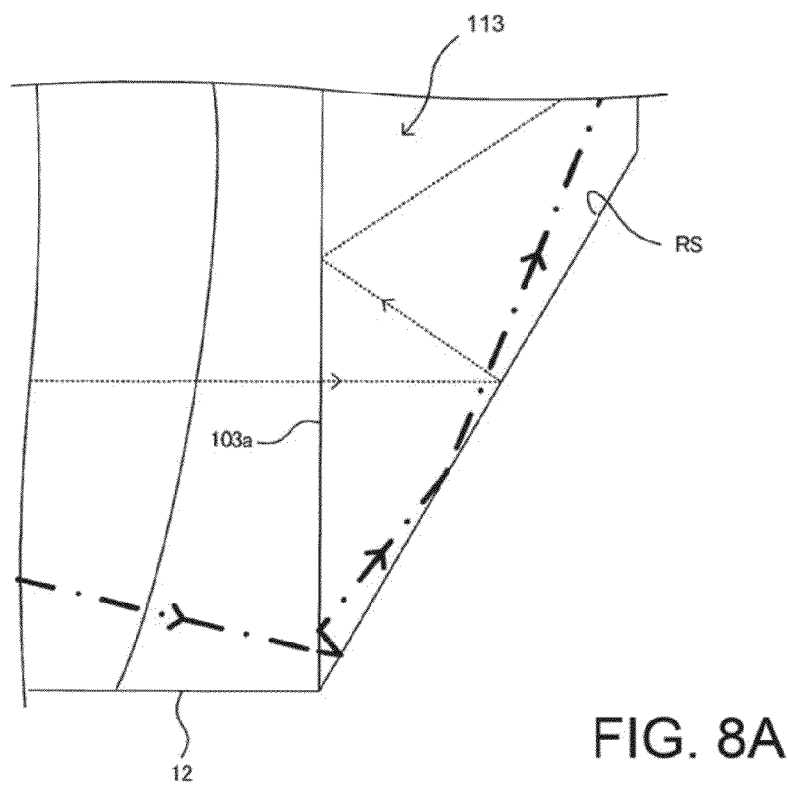
FIG. 8A is a cross-sectional view of a key portion showing optical paths in a case where a ghost spot is produced in the head-mounted display of related art.
Figure 8B:
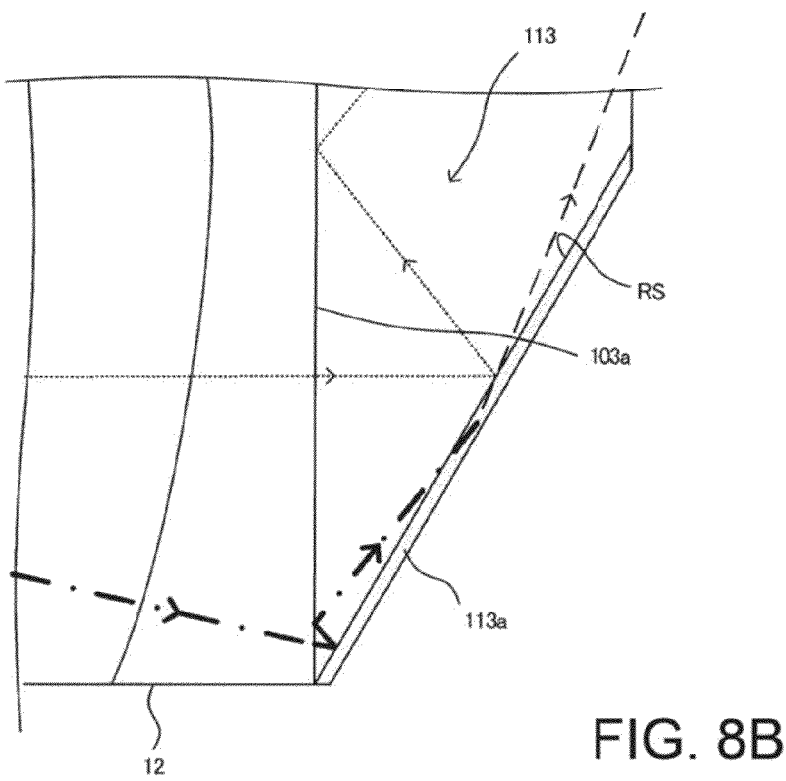
FIG. 8B is an enlarged view showing that the ghost spot is eliminated by a light absorption layer according to a second embodiment.

In the present embodiment, only one light absorption layer described above is formed on the prism reflection surface RS of the prism portion 113, as shown in FIG. 8B. Specifically, a light absorption film 113a is formed on the prism reflection surface RS in a contact bonding process, and a reflection film made, for example, of aluminum is formed on the light absorption film 113a. The light guide portion 22 having the light absorption layer 123a (second absorption layer) formed on the prism reflection surface RS may be manufactured by bonding a light absorption film with a reflection film to the prism portion 113 or forming a reflection film after a light absorption film is attached.

Figure 10A:
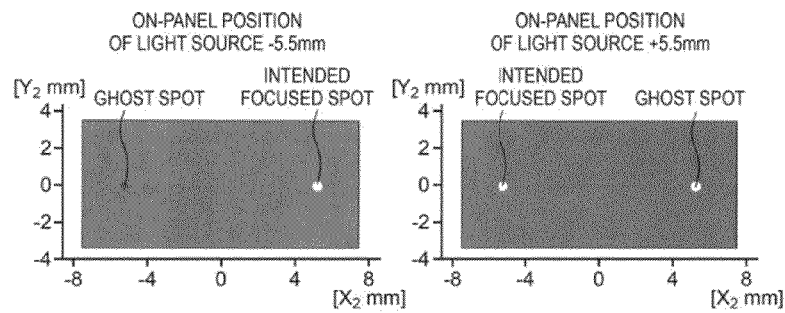
FIG. 10A shows that a ghost spot is eliminated in the second embodiments and FIG. 10B shows that a ghost spot is eliminated in a third embodiment.

In the display apparatus according to the present embodiment, a ghost-producing component of the image light outputted from the display device 11 is immediately eliminated at the prism reflection surface RS, which reflects light at the end of the light guide portion 22. That is, an angular component incident on. the prism portion 113 at a shallow angle (dashed line in FIG. 8A) is reflected off the prism reflection surface RS and forms an inappropriate angular component different from a primary. appropriate angular component (dotted line in FIG. 8A), resulting in a ghost spot, as shown in FIG. 8A. In the present embodiment, since the light absorption film 113a is formed on the prism reflection surface RS of the prism portion 113, an appropriately incident angular component impinges on the prism portion 113 at a deep angle (about 30° with respect to a normal to the reflection layer) and hence travels a short distance in the light absorption film, which means that the amount of absorbed light is small, as shown in FIG. 8B. On the other hand, an angular component incident on the prism portion 113 at a shallow angle (about 80° to 90° with respect to a normal to the reflection layer) travels a long distance in the light absorption film 113a, which means that the amount of absorbed light is large. As a result, in the present embodiment, the light absorption film 113a can absorb and immediately eliminate only an angular component inappropriately incident on the light guide portion 22, whereby the degree of produced ghost spot can be reduced, as shown in FIG. 10A.

Third Embodiment

A third embodiment of the invention will further be described. The present embodiment is characterized in that the light absorption layers described in the above first and second embodiments are disposed both on the transflective layers and the prism surface. In the present embodiment, the same components as those in the first and second embodiment described above have the same reference characters and have the same functions and other features unless otherwise stated, and no description of the same components will be made.

Specifically, in the present embodiment, not only are the light absorption layers disposed on the eyeball-side surfaces of the transflective layers 123b, but also one light absorption film described above is formed on the prism surface in a contact bonding process and a reflection film made, for example, of aluminum is formed on the light absorption film. The base of the light guide member is made of PMMA, COC, COP, or any other highly transparent material, and the reflection layers and the light absorption layers are layered on the base, as in the first embodiment described above. The light absorption material can, for example, be carbon, titanium black, or a black dye, and a light absorption film can be produced by mixing the transparent member described above with any of the materials described above by an appropriate amount. As each of the transflective layers 123b, a transflective film produced by layering a light absorption layer and a metal film or a dielectric multilayer film can be sandwiched between transparent members.

In the display apparatus according to the present embodiment, an inappropriate angular component of the image light having exited out of the image formation unit 10 is not only immediately eliminated at the prism reflection surface RS provided at the end of the light guide portion 22 but also guided through the light guide portion 22 and then absorbed in the last portion of the optical path by the light absorption layers 123a on the transflective layers 123b, which face the eyes of the viewer, for more reliable elimination of the inappropriate angular component.

In detail, an inappropriate angular component of the image light outputted from the display device 11 is immediately eliminated at the prism reflection surface RS, which reflects light at the end of the light guide portion 22. That is, since the light absorption film 113a is formed on the prism reflection surface RS of the prism portion 113, an appropriately incident angular component is incident on the prism portion 113 at a deep angle (about 30° with respect to a normal to the reflection layer) and hence travels a relatively short distance in the light absorption film, which means that the amount of absorbed light is small, as shown in FIG. 8B. On the other hand, an angular component incident on the prism portion 113 at a shallow angle (about 80° to 90° with respect, to a normal to the reflection layer) travels a long distance in the light absorption film 113a, which means that the amount of absorbed light is large. As a result, according to the present embodiment, the light absorption film 113a can absorb and immediately eliminate only an angular component inappropriately incident on the light guide portion 22.

Figure 10B:
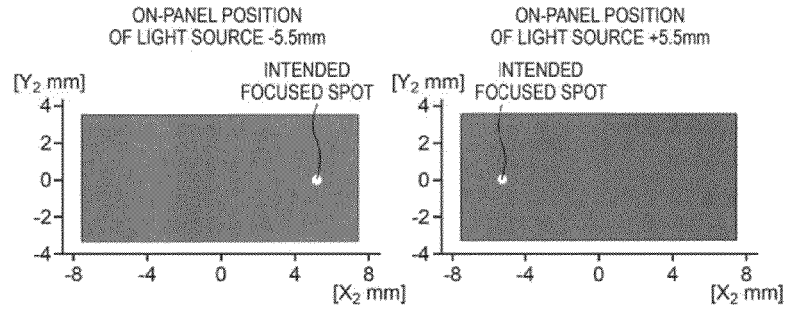

On the other hand, a portion of the inappropriate angular component that has not been eliminated at the prism reflection surface RS is incident on the transflective layers 123b at a shallow angle (about 80° to 90° with respect to a normal to the reflection layer) and hence travels a long distance in the transflective layers 123b, which means that the amount of absorbed light is large and substantially all the inappropriate angular component is absorbed. On the other hand, an angular component appropriately incident on the prism reflection surface RS is incident on the transflective layers 123b at a deep angle (about 30° with respect to a normal to the reflection layer) and hence travels relatively short distance therein, which means that the amount of absorbed light is small. As a result, generation of a ghost spot can be almost completely suppressed, as shown in FIG. 10B.

The entire disclosure of Japanese Patent Application No. 2012-232571, filed Oct. 22, 2012 is expressly incorporated by reference herein.

What is claimed is:

1. An optical device comprising:
    a light guide member that guides image light from a light incident portion on which the image light is incident to a light exiting portion from which the image light exits; and
    a first optical layer disposed in the light guide member, tilted to a surface of the light exiting portion, and optically acting on the guided image light,
    wherein the first optical layer is a layered film produced by layering
    a first light absorption layer that absorbs part of the guided image light, and a first transflective layer that reflects at least part of the image light unabsorbed by the first light absorption layer toward the light exiting portion and transmits at least another part of the unabsorbed image light.

2. An optical device comprising:
a light guide member that guides image light from a light incident portion on which the image light is incident to a light exiting portion from which the image light exits; and
a second light absorption layer provided on a surface of the light guide member,
wherein the light guide member has a reflection surface tilted to a surface of the light incident portion, and
the second light absorption layer is disposed on the reflection surface.

3. The optical device according to claim 1,
wherein the first light absorption layer is located on the side of the first transflective layer that faces the light exiting portion.

4. The optical device according to claim 1,
further comprising a second optical layer that optically acts on the image light having passed through the first transflective layer,
wherein the second optical layer is a layered film produced by layering
a third light absorption layer that absorbs part of the image light having passed through the first transflective layer, and
a second transflective layer that reflects at least part of the image light having passed through the first transflective layer but having been unabsorbed by the third light absorption layer toward the light exiting portion and transmits at least another part of the unabsorbed image light.

5. The optical device according to claim 1,
wherein the first optical layer and the second optical layer extend in a direction tilted to the surface of the light exiting portion by an angle ranging from 29° to 31°.

6. The optical device according to claim 1,
wherein each of the first transflective layer and the second transflective layer includes a dielectric multilayer film.

7. The optical device according to claim 2,
further comprising a reflection film on an outer surface of the second light absorption layer.

8. A method for manufacturing an optical device that guides image light from a light incident portion on which the image light is incident to a light exiting portion from which the image light exits, the method comprising:
forming a layered member between a first light transmissive base and a second light transmissive base, the layer member including
a first light absorption layer that absorbs part of light incident thereon, and
a first transflective layer that reflects at least part of the light reabsorbed by the first light absorption layer and transmits at least another part of the unabsorbed light; and
cutting the layered member in a direction tilted to the direction in which the first transflective layer and the first light absorption layer extend.

9. An image display apparatus comprising the optical device according to claim 1.

10. An image display apparatus comprising the optical device according to claim 2.

11. An image display apparatus comprising the optical device according to claim 3.

12. An image display apparatus comprising the optical device according to claim 4.

13. An image display apparatus comprising the optical device according to claim 5.

14. An image display apparatus comprising the optical device according to claim 6.

15. An image display apparatus comprising the optical device according to claim 7.

* * * * *